United States Patent [19]
Vogel

[11] Patent Number: 5,357,763
[45] Date of Patent: Oct. 25, 1994

[54] PUMP DOWN TOOL WITH INFLATABLE VALVE MEMBER

[76] Inventor: Joseph Vogel, Box 59, Lake Rd., Delanson, N.Y. 12053

[21] Appl. No.: 210,680

[22] Filed: Mar. 18, 1994

[51] Int. Cl.$^5$ ............................................. F25B 45/00
[52] U.S. Cl. ........................................ 62/77; 62/292; 251/61.1; 138/93
[58] Field of Search ................... 62/292, 77; 251/61.1; 138/93, 94, 94.3

[56] References Cited

U.S. PATENT DOCUMENTS

| | | |
|---|---|---|
| 3,125,867 | 3/1964 | Rath . |
| 3,299,648 | 1/1967 | White et al. . |
| 3,561,090 | 2/1971 | Fritch . |
| 3,840,967 | 10/1974 | Olson . |
| 3,875,756 | 4/1975 | Olson . |
| 3,935,713 | 2/1976 | Olson . |
| 3,996,765 | 12/1976 | Mullins . |
| 4,458,497 | 7/1984 | Kubik . |
| 4,996,848 | 3/1991 | Nelson et al. ............................ 62/77 |
| 5,024,061 | 6/1991 | Pfeil, Jr. et al. . |
| 5,046,320 | 9/1991 | Loose et al. ............................ 62/77 |
| 5,172,557 | 12/1992 | Hubbell, Jr. . |

*Primary Examiner*—John M. Sollecito
*Attorney, Agent, or Firm*—Schmeiser, Morelle & Watts

[57] ABSTRACT

A pump down tool for facilitating the servicing of a refrigeration system. The tool utilizes a pump down head having an inflatable balloon member for blocking the liquid line of the refrigeration system, thereby isolating the system refrigerant within the condenser of the refrigeration system.

13 Claims, 8 Drawing Sheets

FIG_ 3

PUMP DOWN TOOL WITH INFLATABLE VALVE MEMBER

FIELD OF THE INVENTION

The present invention relates to a tool for servicing refrigeration systems and, more particularly, to a pump down tool having an inflatable balloon for blocking the liquid line of a refrigeration system during a pump down procedure, thereby allowing the system refrigerant to be captured and isolated within the condenser of the refrigeration system.

BACKGROUND OF THE INVENTION

In a refrigeration system that utilizes a compressible evaporative refrigerant to transfer heat, the refrigerant must oftentimes be removed prior to a servicing of the system, and subsequently recharged after any necessary repairs have been completed.

In the past, refrigerants were typically vented directly into the atmosphere during the servicing of a refrigeration system. Recently, due primarily to the refrigerant actuated depletion of the ozone layer, a plethora of governmental regulations have been established to prevent the deleterious atmospheric release of refrigerants, especially those refrigerants containing chlorofluorocarbons (CFCs) and hydrochlorofluorocarbons (HCFCs). In compliance with such regulations, many complex refrigerant reclamation and recharging systems have been developed to temporarily remove the refrigerant from a refrigeration system under service. Unfortunately, to avoid the expensive and time consuming process of refrigerant reclamation, unscrupulous refrigeration technicians may discharge the refrigerant from a refrigeration system directly into the atmosphere, illegally circumventing the required reclamation process.

SUMMARY OF THE INVENTION

In order to avoid the disadvantages of the prior art, the present invention provides a pump down tool for blocking the liquid refrigerant line of a refrigeration system, advantageously resulting in the capture of the refrigerant within the condenser of the refrigeration system and obviating the expensive and time consuming refrigerant reclamation and recharging process.

The pump down tool of the present invention is a Schrader core removal tool, such as those disclosed in U.S. Pat. Nos. 3,840,967, 3,875,756 and 3,935,713, incorporated herein by reference, which has been modified to additionally insert an inflatable pump down head into the liquid refrigerant line of a refrigeration system through a conventional Schrader valve. The pump down tool includes a body member having a cylindrical, longitudinal passageway extending therethrough, a coupling nut for removably securing a first end portion of the body member to a Schrader valve disposed on the liquid line service port of a refrigeration system, a control knob assembly for displacing a removable, longitudinally displaceable, hollow operating shaft along the longitudinal passageway within the body member, and a tool service port, disposed on the control knob assembly, for directing an external source of a gas through the hollow operating shaft into the inflatable pump down head.

A valve core engaging chuck or an inflatable pump down head may be interchangeably attached to a first end portion of the hollow operating shaft during the servicing of a refrigeration system. Initially, to access the interior of the liquid line of the refrigeration system under service, the body member of the pump down tool is suitably coupled to the Schrader valve on the liquid line service port. After shutting off the refrigeration system and securing the valve core engaging chuck to the distal end of the removable, longitudinally displaceable, hollow operating shaft, the core of the Schrader valve is engaged and removed in a conventional manner. To prevent any unwanted depressurization of the refrigeration system after the successful removal of the valve core, a shut-off valve assembly is utilized to block the longitudinal passageway disposed within the body member of the pump down tool. Following the removal of the Schrader valve core, the control knob assembly is utilized to withdraw the hollow operating shaft from the longitudinal passageway of the body member, and the core engaging chuck is removed from the end of the hollow operating shaft and subsequently replaced with the inflatable pump down head.

A pump down procedure is initiated by introducing the inflatable pump down head into the liquid line of the refrigeration system. More specifically, the hollow operating shaft and attached inflatable pump down head are inserted into the longitudinal passageway of the body member using the control knob assembly. After reattaching the control knob assembly to the body member of the pump down tool, the shut-off valve assembly is suitably manipulated to reopen the longitudinal passageway within the body member, and the inflatable pump down head is inserted through the longitudinal passageway into the liquid line of the refrigeration system. Once inserted, an external source of a gas such as nitrogen or the like is attached to the tool service port on the control knob assembly. After opening a flow valve on the external source of gas, the inflatable pump down head is inflated as the gas flows therein through the hollow operating shaft, thereby closing off the liquid line of the refrigeration system. The system refrigerant is captured within the condenser of the refrigeration system in response to the inflation of the pump down head and the subsequent activation of the refrigeration system. Advantageously, the isolation of the refrigerant within the condenser of the refrigeration system allows a service technician to access, repair and/or replace many of the components of the refrigeration system, without having to perform the time consuming and expensive processes of refrigerant reclamation and recharging. Further, the pump down procedure allows the service technician to easily determine whether the compressor valves are in proper operating condition; if the system will not pump down, the compressor should be repaired or replaced.

BRIEF DESCRIPTION OF THE DRAWINGS

These and other features of the present invention will become readily apparent upon reading the following detailed description and upon reference to the drawings in which.

DETAILED DESCRIPTION OF THE INVENTION

Figure 1:
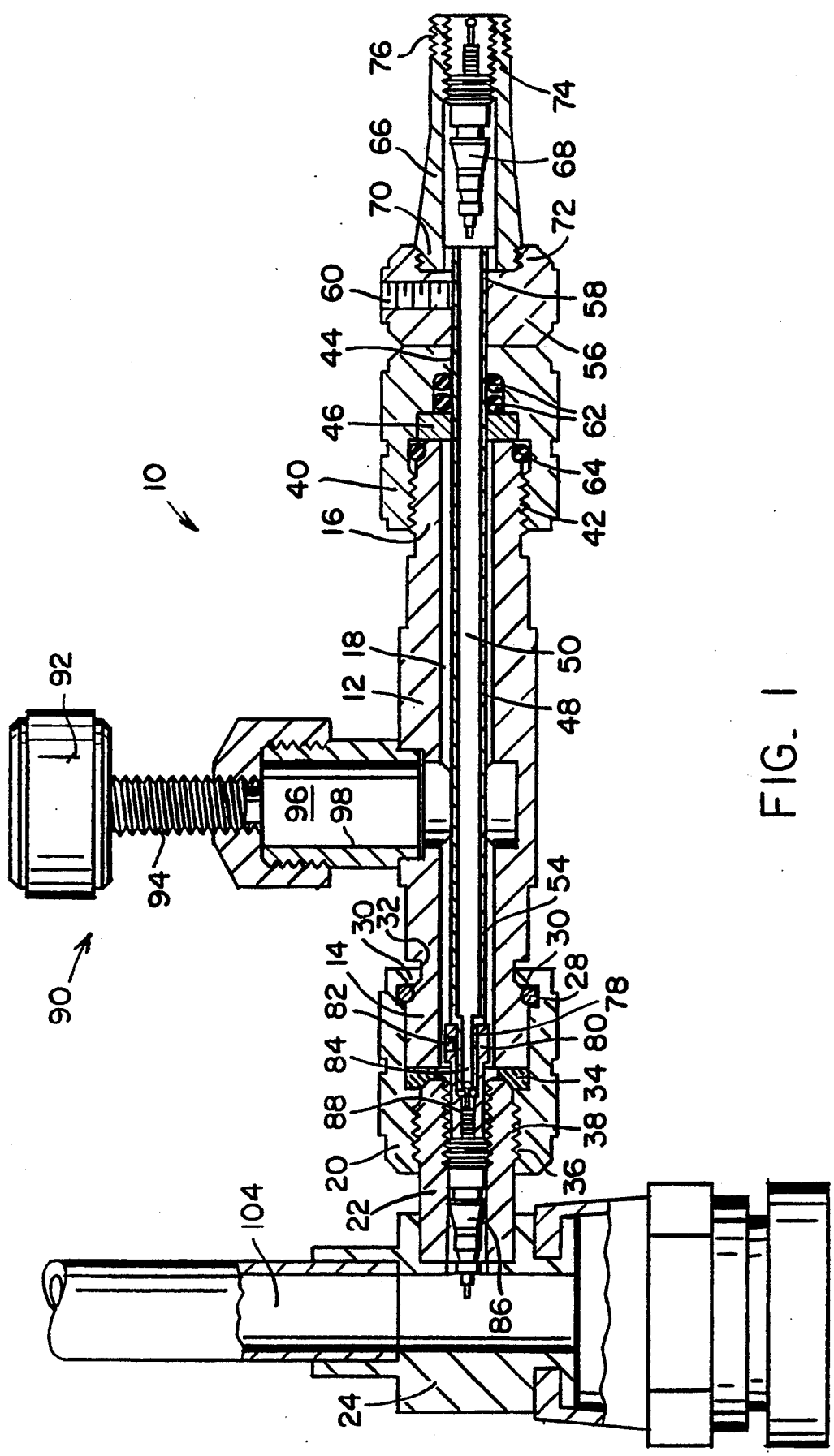
FIG. 1 is a cross-sectional view of a preferred embodiment of the present invention during a valve core removal procedure, illustrating the initial engagement of the valve core engaging chuck and the core of a Schrader valve disposed on the liquid line service port of a refrigeration system.

Referring now specifically to the drawings, there is illustrated a pump down tool, generally designated as 10, in accordance with a preferred embodiment of the present invention, wherein like reference numerals refer to like components throughout the drawings.

As illustrated throughout the drawings, the pump down tool 10 of the present invention includes a body member 12 having a first end portion 14, a second end portion 16, and a longitudinal passageway 18 passing completely therethrough.

A coupling nut 20, for removably securing the pump down tool 10 about a conventional Schrader valve 22 on the liquid line service port 24 of a refrigeration (air conditioning) system 26 (FIGS. 4–5), includes a snap ring 28 and flange members 30 for rotatably engaging a circumferential groove 32 formed about the outer periphery of the first end portion 14 of the pump down tool. The coupling nut 20 further includes a gasket 34, formed of rubber or the like, and internal threads 36 for receiving the external threads 38 of the Schrader valve 22.

An internally threaded access cap 40 is threadedly secured to the external threads 42 formed on the outer periphery of the second end portion 16 of the body member 12. The access cap 40 includes a bore 44 formed coaxially with the longitudinal passageway 18, and an annular retainer 46.

A removable, longitudinally displaceable, hollow operating shaft 48, having a cylindrically shaped outer periphery, extends through the bore 44 and the annular retainer 46. As illustrated most clearly in FIGS. 1 and 9, and as described in further detail hereinbelow, the bore 50 of the hollow operating shaft extends along the entire length of the shaft, thereby providing an unobstructed passageway for the passage of gas during the inflation of a pump down head 52 (FIGS. 9–11) during a pump down procedure. A first end portion 54 of the hollow operating shaft 48 is longitudinally displaceable within the longitudinal passageway 18. A control knob assembly 56 is fixedly secured about a second end portion 58 of the hollow operating shaft via set screw 60, with the bore 50 of the hollow operating shaft 48 extending completely therethrough. O-rings 62 form a fluid-tight seal between the access cap 40 and the hollow operating shaft 48. Analogously, O-ring 64 provides a fluid-tight seal between the access cap 40 and the second end portion 16 of the body member 12.

An external source of gas (not shown) is removably attached to the pump down tool 10 during a pump down procedure via tool service port 66. As detailed in FIG. 1, the tool service port 66 preferably includes a Schrader valve incorporating a conventional valve core 68 therein. A first, externally threaded end portion 70 of the tool service port 68 is threadedly secured to an internally threaded portion 72 of the control knob assembly 56. A second end portion 74 of the tool service port 66 includes external threads 76 for receiving a hose (not shown) attached to the external source of gas.

As illustrated in FIG. 1, the first end portion 54 of the hollow operating shaft 48 includes a reduced, hollow section 78 which is removably received within a valve core engaging chuck 80, and suitably secured therein with set screw 82. The reduced, hollow section 78 incorporates a bore 84 for receiving the outwardly extending head of the Schrader valve core 86 being engaged by the valve core engaging chuck 80. A transverse slot 88 is formed in the valve core engaging chuck 80 for receiving the rectangular portion of the valve core 86 therein during the threading or unthreading of the valve core from its fitting within the Schrader valve 22.

A shut-off valve assembly 90, such as that described in U.S. Pat. No. 3,935,713, is utilized to selectively block the longitudinal passageway 18 in the body member 12 of the pump down tool. Generally, the shut-off valve assembly 90 includes a control knob 92 and valve stem 94 for axially displacing a cylindrically shaped resilient valve member 96 within a lateral bore 98. FIG. 1 illustrates the shut-off assembly 90 in the open position with the resilient valve member 96 fully retracted within the lateral bore 98. Correspondingly, FIG. 2 illustrates the shut-off assembly 90 in the closed position with the resilient valve member 96 blocking the longitudinal passageway 18.

In accordance with the preferred embodiment of the present invention, the pump down tool 10 is utilized to sequentially remove the valve core from the Schrader valve on the liquid line service port of a refrigeration system, insert and inflate an inflatable pump down head within the liquid line (FIGS. 9–11) to initiate and perform a pump down procedure, and reinsert the valve core after completion of the pump down procedure.

Removal of Schrader Valve Core

Figure 2:
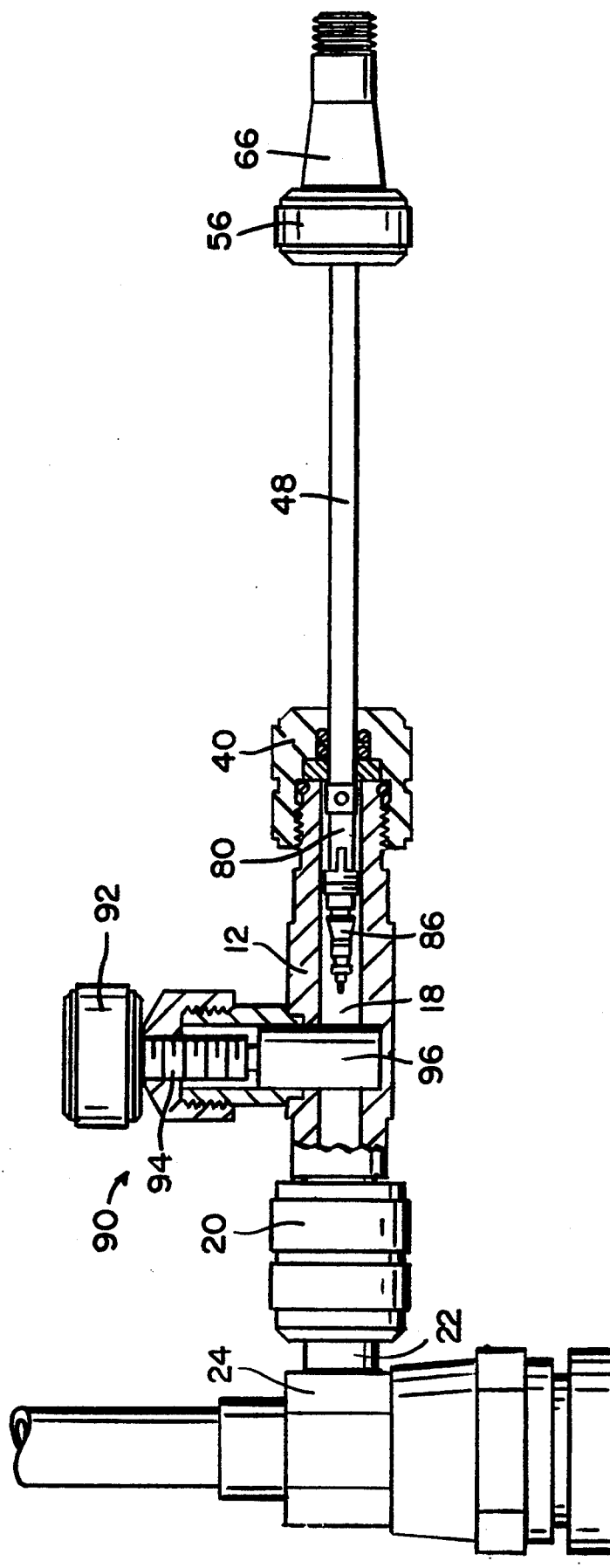
FIG. 2 is a cross-sectional view similar to FIG. 1, illustrating the withdrawal of the valve core through the longitudinal passageway of the pump down tool, and the subsequent closure of the shut-off valve assembly to prevent the release of refrigerant through the tool.
Figure 3:
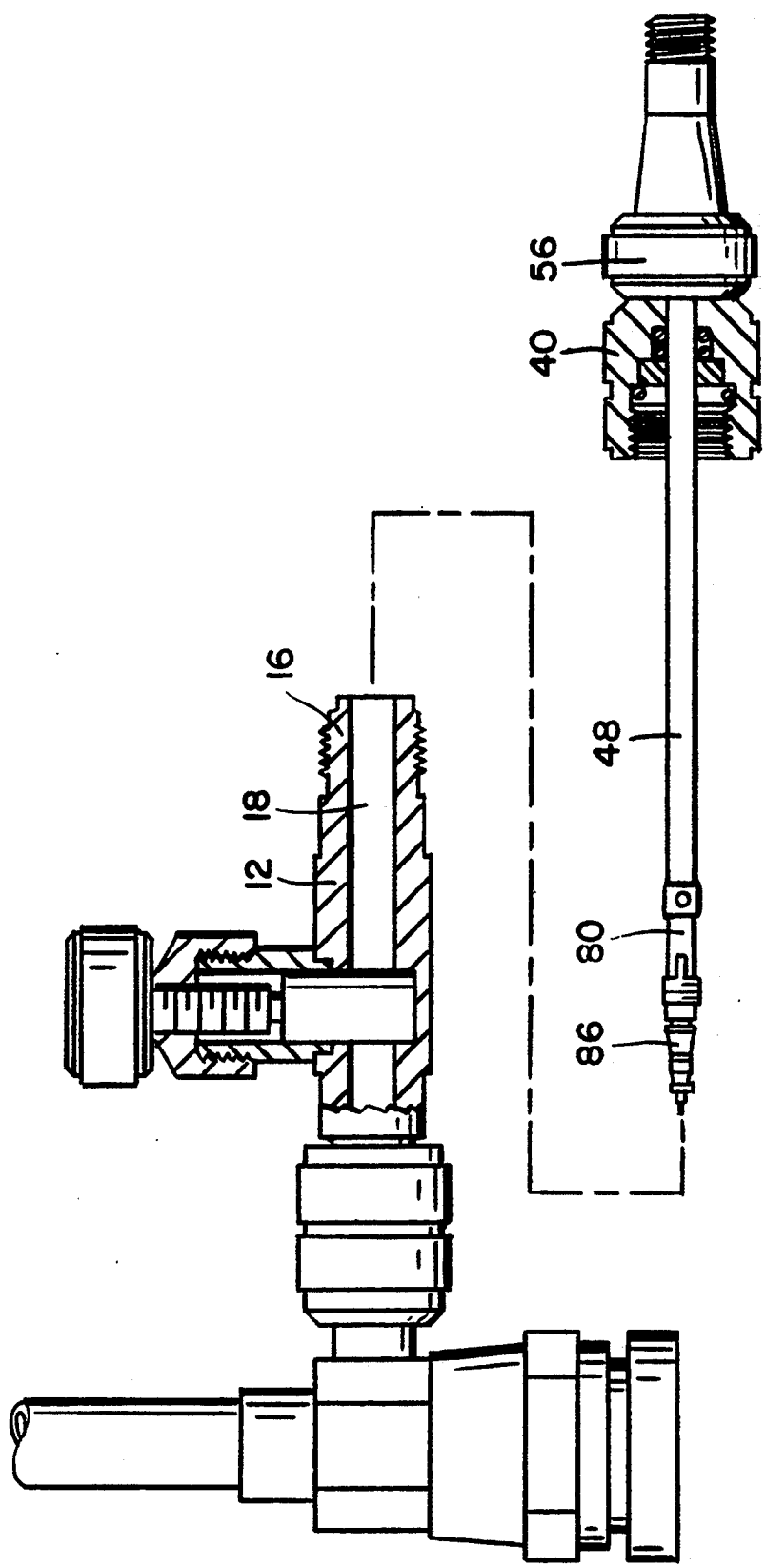
FIG. 3 is a cross-sectional view similar to FIG. 2, illustrating the complete removal of the valve core.

The Schrader valve core 86 is removed in a conventional manner as illustrated in FIGS. 1–3. Referring first to FIG. 1, the coupling nut 20 is rotatably employed, after turning off the power to the refrigeration system 26, to secure the pump down tool 10 about the Schrader valve 22. With the shut-off valve assembly 90 in the open position, the control knob assembly 56 is actuated to insert the hollow operating shaft 48 and the attached valve core engaging chuck 80 into and through the longitudinal passageway 18 to engage the valve core 86. After the rectangular portion of the valve core 86 is appropriately seated within the transverse slot 88 in the valve core engaging chuck 80, the valve core is unthreaded by turning the control knob assembly 56 counterclockwise. Following the complete unthreading of the valve core 86, the control knob assembly 56 is withdrawn as far as possible as illustrated in FIG. 2. The shut-off valve assembly 90 is then suitably manipulated to block the longitudinal passageway 18, thereby preventing the release of system refrigerant through the pump down tool. Finally, as shown in FIG. 3, the access cap 40 is unthreaded from the second end portion 16 of the body member 12, and the access cap 40, control knob assembly 56, hollow operating shaft 48, valve core engaging chuck 80 and valve core 86 are fully detached and withdrawn from the body member 12 of the pump down tool 10.

Figure 4:
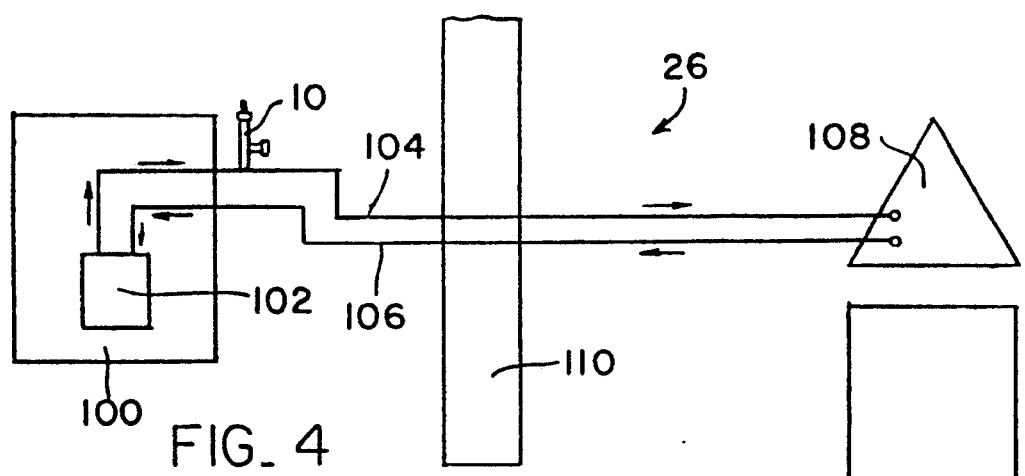
FIG. 4 is a schematic view of a residential refrigeration system with the pump down tool of the present invention attached to the liquid line service port of the refrigeration system.
Figure 5:
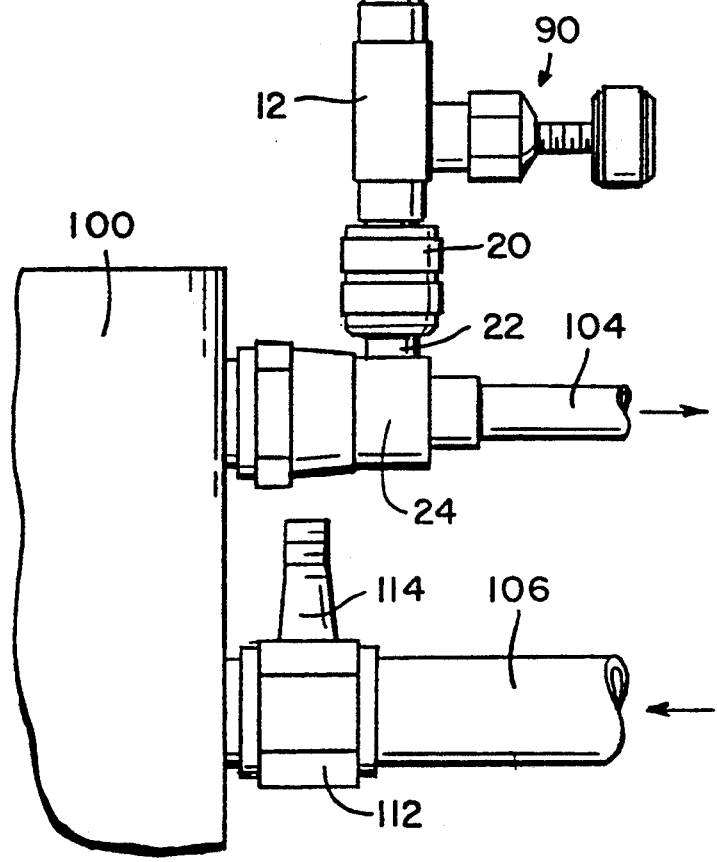
FIG. 5 is an enlarged view of the liquid line and suction line service ports of the refrigeration system illustrated in FIG. 4.

Referring now specifically to FIG. 4, there is illustrated a generic residential refrigeration (air conditioning) system 26 with the pump down tool 10 of the present invention attached thereto, wherein the refrigeration system 26 generally includes a condensing unit 100 incorporating a compressor 102 therein, a liquid line 104, a suction line 106 and an indoor coil 108 (evaporator). As indicated by a series of directional arrows, the system refrigerant flows through the liquid line 104 from the condensing unit 100 to the indoor coil 108, with the liquid line 104 typically passing through a foundation wall 110. After exiting the indoor coil 108, the refrigerant is subsequently drawn into the low pressure side of the condensing unit 100 through the suction line 106. As illustrated in the enlarged view provided by FIG. 5, the liquid line service port 24 is disposed between the condensing unit 100 and the liquid line 104. Similarly, a suction line service port 112, having a conventional Schrader valve 114, is positioned between the condensing unit 100 and the suction line 106. The pump down tool 10 is attached to the liquid line service port 24 of the refrigeration system as illustrated in FIG. 5.

Pump Down Procedure

Figure 9:
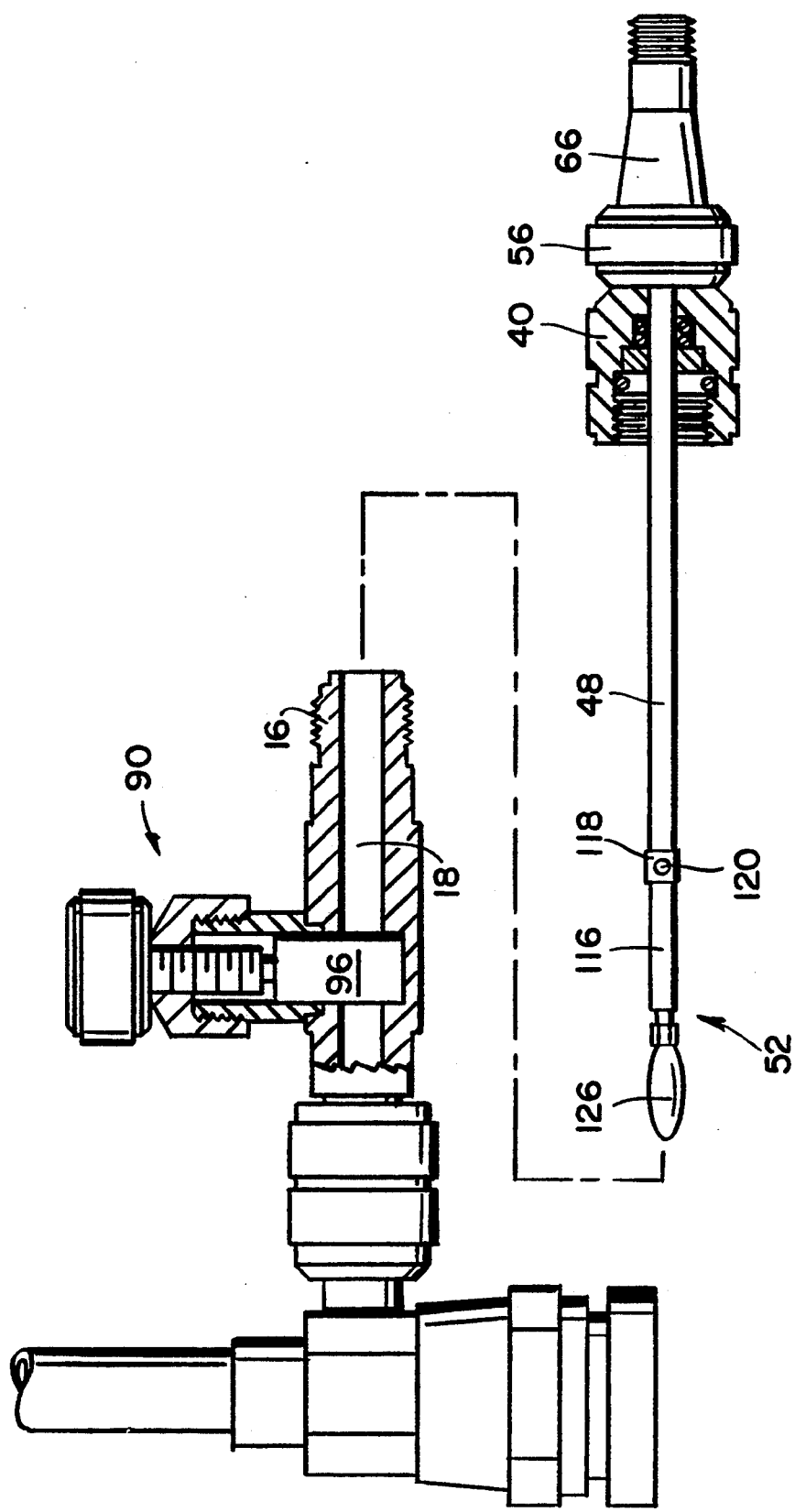
FIG. 9 is a cross-sectional view of the hollow operating shaft with the inflatable pump down head interchangeably attached to an end portion thereof, prior to the insertion of the inflatable pump down head into the longitudinal passageway of the pump down tool.
Figure 10:
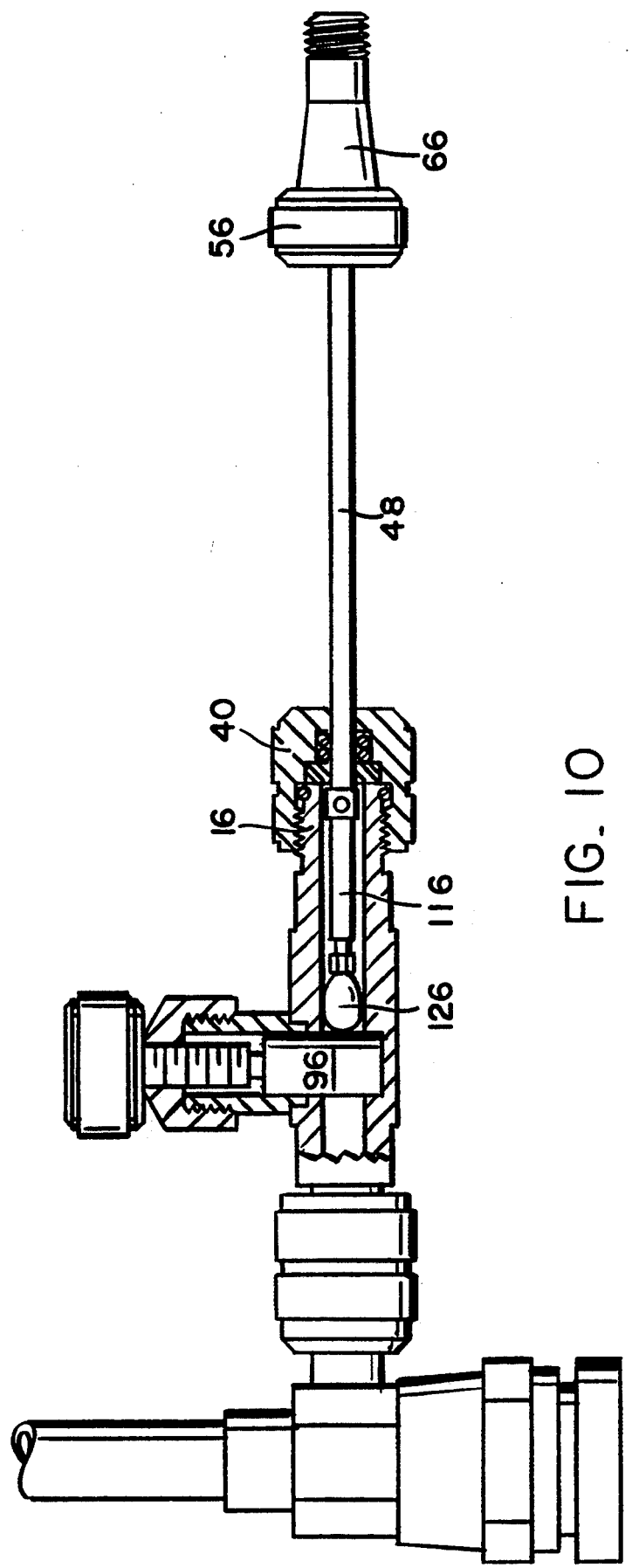
FIG. 10 is a cross-sectional view similar to FIG. 9, illustrating the initial insertion of the inflatable pump down head into the longitudinal passageway of the pump down tool.
Figure 11:
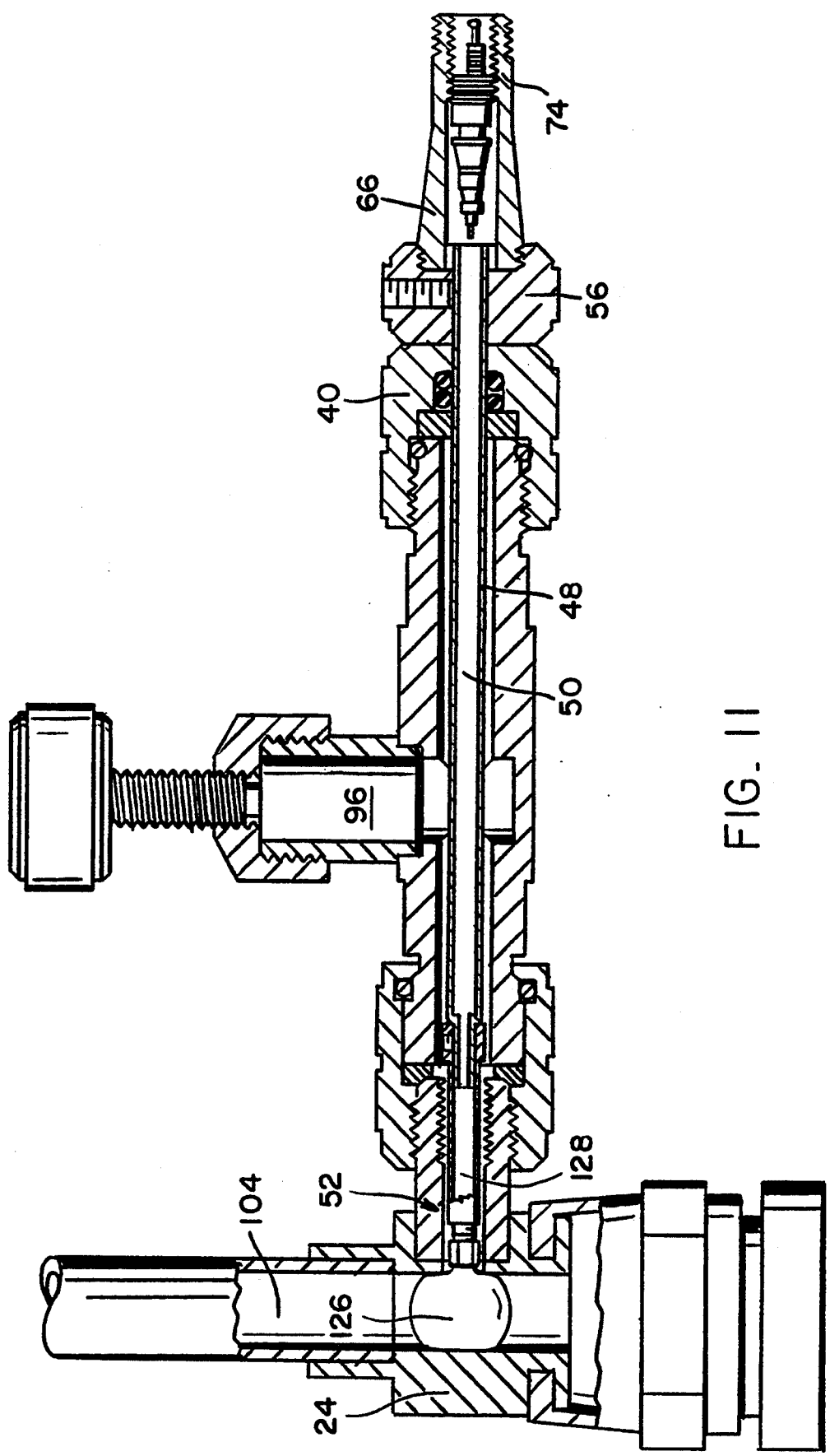
FIG. 11 is a cross-sectional view of the pump down tool with the inflatable pump down head inserted and inflated within the liquid line of the refrigeration system.

A pump down procedure is performed by inserting an inflatable pump down head 52 into the liquid line 104 of the refrigeration system 26. As illustrated in FIGS. 9-11, the pump down head 52 is inserted into the liquid line 104 through the Schrader valve 22 on the liquid line service port 24 using the pump down tool 10 of the present invention.

Figure 6:
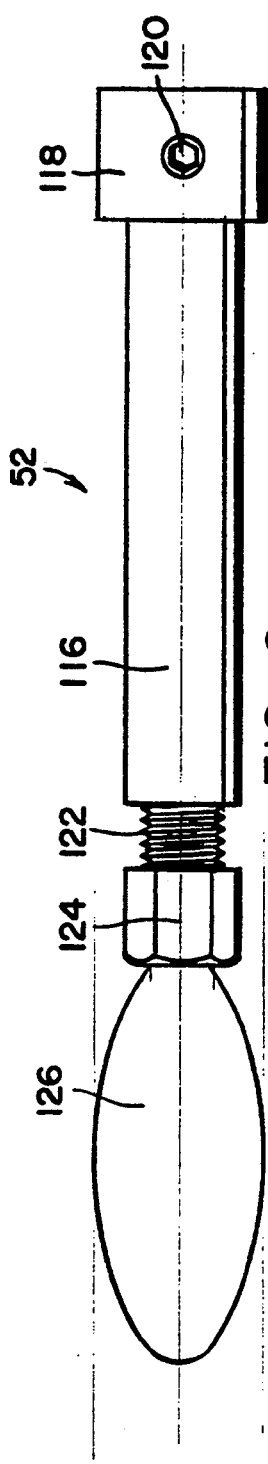
FIG. 6 is an enlarged view of an inflatable pump down head in accordance with a preferred embodiment of the present invention.
Figure 7:
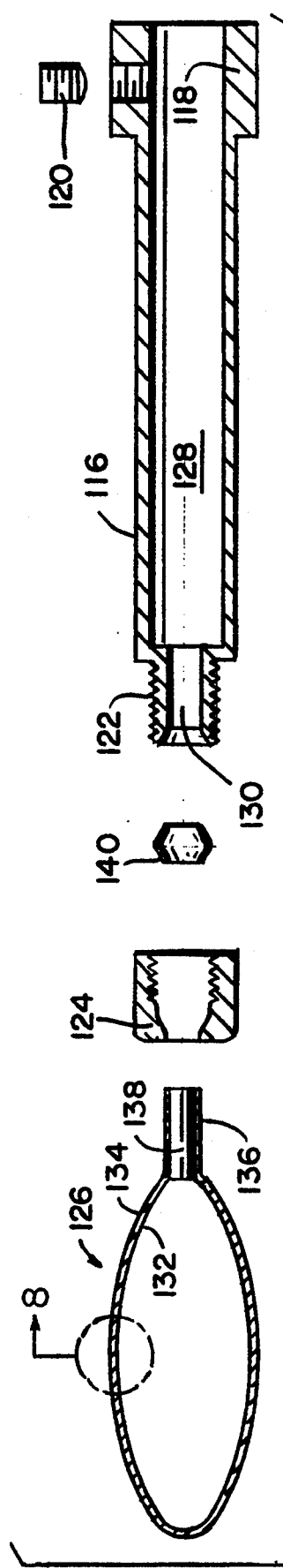
FIG. 7 is an exploded, cross-sectional view of the inflatable pump down head of FIG. 6.
Figure 8:
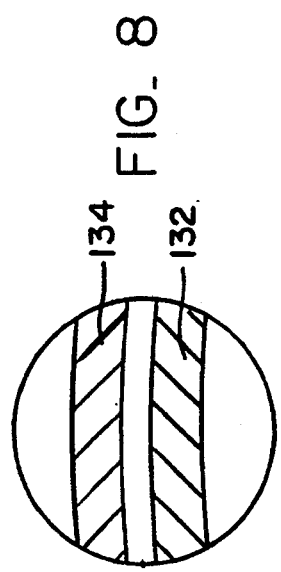
FIG. 8 is a partial enlarged view of the inflatable balloon member illustrated in FIG. 7.

The pump down head 52 is illustrated in detail in FIGS. 6-8. The pump down head 52 includes a hollow shaft 116, a retainer 118, a set screw 120 for removably securing the retainer 118 about the reduced, hollow end section 78 of the hollow operating shaft 48, a reduced, hollow, externally threaded end portion 122 for receiving a coupling nut 124 thereover, and an inflatable balloon member 126. A conduit for the passage of gas, comprising bores 128 and 130, extends along the entire length of the pump down head 52.

The inflatable balloon member 126 comprises an inner inflatable balloon 132 for blocking the liquid line 104 during a pump down procedure, and an outer protective sac 134 for enclosing and protecting the balloon 132 when inserted into the liquid line 104 or during insertion therein through the pump down tool 10 and Schrader core 22. If a rupture should occur, the outer sac 134 is adapted to prevent pieces of the balloon 132 from entering the liquid line 104 and potentially damaging the refrigeration system. The inner inflatable balloon 132 may be formed from any expandable material which is robust enough to withstand the external refrigerant fluid pressure exerted thereagainst when the balloon is inserted and inflated within the liquid line 104 during a pump down procedure. Analogously, the outer sac 134 is preferably formed from a strong, tear resistant nylon mesh fabric or the like. As shown in FIG. 8, the inner inflatable balloon 132 is preferably freely movable within the outer protective sac 134. Alternately, the inner inflatable balloon 132 may be integrally formed with an expandable, protective outer covering.

An exploded view of a preferred embodiment of the pump down head 52 is presented in FIG. 7. As illustrated, the reduced, hollow, externally threaded end portion 122 of the hollow shaft 116 is inserted and suitably secured within the internally threaded coupling nut 124, after the base 136 of the inflatable balloon member 126 and enclosed hollow bushing 138 have been inserted through the coupling nut 124 and ferrule 140.

In anticipation of the pumping down of the refrigeration system, the retainer 118 of the pump down head 52 is secured and tightened about the end section 78 of the hollow operating shaft 48 using the set screw 120. When coupled, a composite bore extends from the tool service port 66 into the interior of the inner inflatable balloon 132, thereby allowing the balloon 132 to be inflated by an external source of gas applied to the tool service port 66. After the pump down head 52 is appropriately secured to the operating shaft 48 (FIG. 9), and with the resilient valve member 96 of the shut-off valve assembly 90 remaining in the closed position, the pump down head 52 is guided as far as possible into the longitudinal passageway 18 of the body member 12 (FIG. 10). Following the insertion of the pump down head 52, the access cap is secured over the second end portion 16 of the body member 12. The inflatable balloon member 126 is subsequently inserted into the liquid line 104 through the decored Schrader valve 22 after the resilient valve member 96 is withdrawn from the longitudinal passageway (FIG. 11). It should be noted that the inflatable balloon member 126 remains in a deflated state at this point in the pump down procedure.

The inflatable balloon member 126 is inflated by connecting an external source of gas to the second end portion 74 of the tool service port 66. When the supply valve on the source of gas is opened, gas flows into the inflatable balloon member 126 after passing through the bores 50 and 128 of the hollow operating shaft 48 and the pump down head 52, respectively, thereby inflating the inflatable balloon member 126 and closing off the liquid line 104. Following the closure of the liquid line 104, the power to the refrigeration system 26 is turned on, and the refrigerant within the liquid line 104, indoor coil 108 and suction line 106, downstream from the now inflated balloon member 126, is pumped down into the condensing unit 100.

The compressor actuated evacuation of the liquid line 104, indoor coil 108 and suction line 108 is continued until the refrigerant pressure therein reaches zero, indicating that all of the refrigerant within this section of the refrigeration system has been captured within the condensing unit 100. Thereafter, the power to the refrigeration system is again disconnected, confining the refrigerant within the condensing unit 100, thereby allowing a service technician to access and repair the line set and indoor coil without any deleterious loss of refrigerant.

Upon completion of any necessary repairs, any contaminants within the liquid line 104, suction line 106 and indoor coil 108 are evacuated by applying a vacuum pump to the Schrader valve 114 disposed on the suction line port 112. The balloon member 126 is subsequently deflated, allowing refrigerant to once again flow through the entire refrigeration system, by removing the external source of gas from the second end portion 74 of the tool service port 66. Finally, the refrigeration system is reactivated by sequentially removing the balloon member 126, reinstalling the Schrader core 86, removing the pump down tool 10, and reestablishing system power.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. In a refrigeration system including a liquid line, an evaporator, a suction line, a compressor, a condenser and a supply of refrigerant, wherein said refrigerant is sequentially cycled through the liquid line, evaporator, suction line and condenser by said compressor, a method for evacuating the refrigerant contained within the liquid line, evaporator and suction line of said refrigeration system and for capturing the evacuated refrigerant within said condenser, comprising the steps of:
   inserting an inflatable member into said liquid line;
   blocking said liquid line by inflating said inflatable member; and
   evacuating the refrigerant contained within the liquid line, evaporator and suction line of said refrigeration system by actuating said compressor, said evacuated refrigerant being captured within the condenser of said refrigeration system, said inflatable member preventing the evacuated refrigerant from reentering said liquid line.

2. The method according to claim 1 further including the step of:
   refilling the liquid line, evaporator and suction line of said refrigeration system with said evacuated refrigerant by deflating said inflatable member.

3. The method according to claim 2 wherein, prior to said refilling step, performing the step of:
   evacuating any contaminants from the liquid line, evaporator and suction line of said refrigeration system.

4. The method according to claim 1, wherein during said inserting step, said inflatable member is inserted into said liquid line adjacent and downstream of said condenser.

5. The method of claim 1, wherein the liquid line of said refrigeration system further includes a liquid line service port having a removable, liquid line access valve, and wherein said inserting step further includes the steps of:
   opening said liquid line access valve; and
   inserting said inflatable member into said liquid line through said liquid line access valve.

6. The method of claim 5, wherein said liquid line access valve further includes a removable core, and wherein said opening step further includes the step of:
   removing the removable core from said liquid line access valve.

7. In a refrigeration system including a liquid line, a liquid line service port for accessing said liquid line, an evaporator, a suction line, a compressor, a condenser and a supply of refrigerant, wherein said refrigerant is sequentially cycled through the liquid line, evaporator, suction line and condenser by said compressor, an apparatus for actuating the evacuation of the refrigerant contained within the liquid line, evaporator and suction line of said refrigeration system, and for actuating the capture of the evacuated refrigerant within said condenser, comprising:
   a body member having a longitudinal passageway extending therethrough;
   a coupling element for securing a first end of said body member to said liquid line service port;
   a hollow operating shaft having first and second end portions, said first end portion having an inflatable member attached thereto, said second end portion including a service port for directing an external source of gas through said hollow operating shaft into said inflatable member, said second end portion further including a control assembly for inserting said inflatable member into said liquid line through the longitudinal passageway of said body member and said liquid line service port;
   wherein said liquid line is blocked in response to an inflation of said inflatable member therein, and wherein the refrigerant contained within the liquid line, evaporator and suction line of said refrigeration system is evacuated therefrom and captured within the compressor of said refrigeration system in response to an actuation of said compressor, said inflatable member preventing the evacuated refrigerant from reentering said liquid line.

8. The apparatus according to claim 7, wherein the first end portion of said hollow operating shaft is adapted to interchangeably receive a valve core engaging chuck thereon.

9. The apparatus according to claim 8, wherein said liquid line service port further includes a liquid line access valve having a removable valve core, and wherein said engaging chuck is adapted to engage and remove said removable valve core in response to a rotation of said hollow operating shaft.

10. The apparatus according to claim 7, wherein said inflatable member comprises:
    an inner, inflatable balloon; and
    an outer shell for enclosing and protecting said inner, inflatable balloon.

11. The apparatus according to claim 7, wherein said body member further includes;
    a shut-off valve assembly for selectively blocking the longitudinal passageway of said body member.

12. In a refrigeration system including a liquid line, a liquid line service port for accessing said liquid line, an evaporator, a suction line, a compressor, a condenser and a supply of refrigerant, wherein said refrigerant is sequentially cycled through the liquid line, evaporator, suction line and condenser by said compressor, a tool for blocking the liquid line of said refrigeration system, thereby actuating the evacuation of the refrigerant contained within the liquid line, evaporator and suction line of said refrigeration system, and the capture of the evacuated refrigerant within said condenser, comprising:

- a body member having a longitudinal passageway extending therethrough;
- a coupling element for securing a first end of said body member to said liquid line service port;
- a hollow operating shaft for inserting an inflatable member into said liquid line through the longitudinal passageway of said body member and the liquid line service port; and
- a service port for directing an external source of gas through said hollow operating shaft into said inflatable member, said external source of gas inflating said inflatable member, thereby blocking said liquid line.

13. The apparatus according to claim 12, wherein said inflatable member comprises:
   - an inner, inflatable balloon; and
   - an outer shell for enclosing and protecting said inner, inflatable balloon.

* * * * *